Jan. 13, 1959　　　　　G. A. GUCKEL　　　　2,868,241
PRODUCT METERING AND CONTAINER FILLING APPARATUS
Filed Oct. 25, 1957　　　　　　　　3 Sheets-Sheet 1
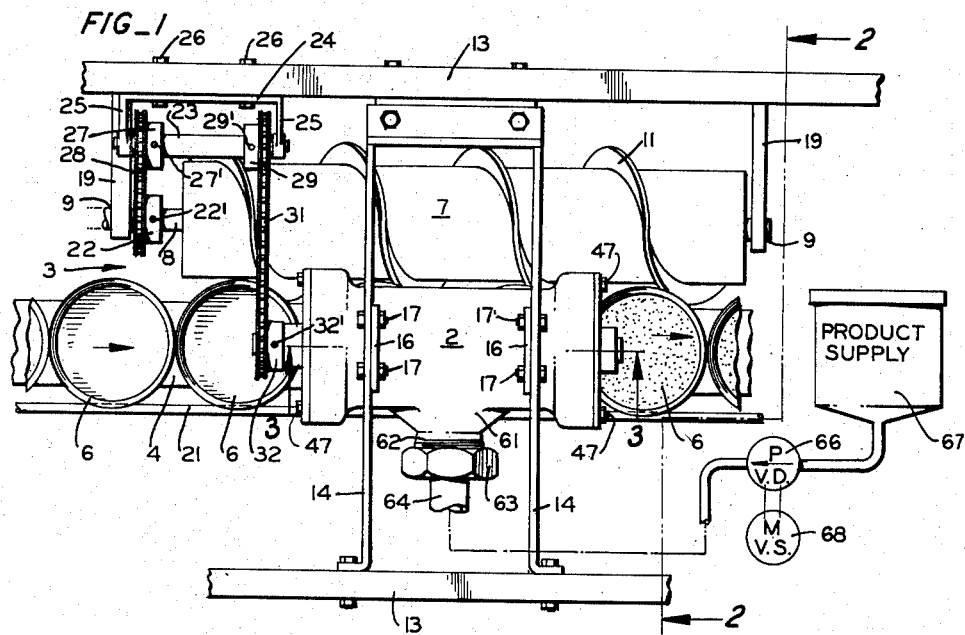
FIG_1
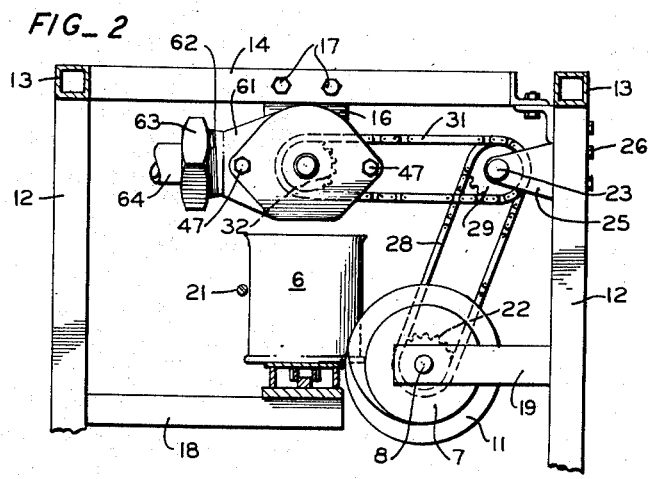
FIG_2
INVENTOR.
GERHART A. GUCKEL
BY
　　ATTORNEYS

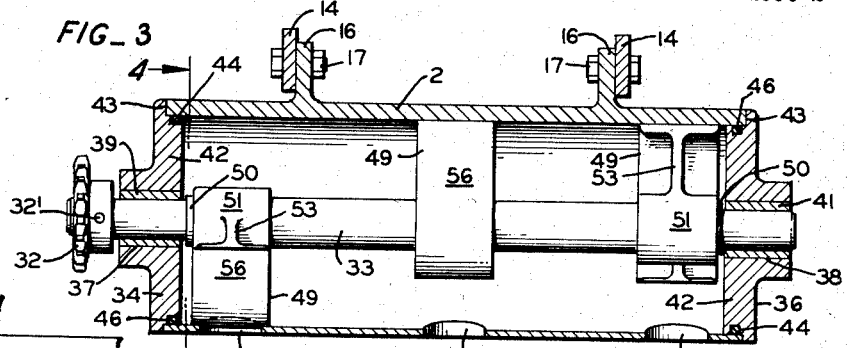
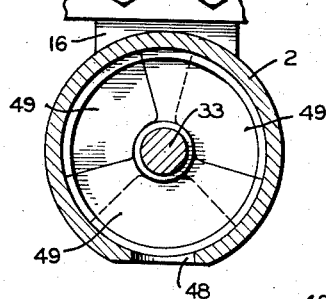
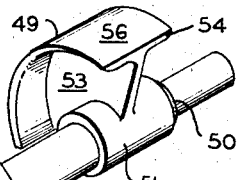
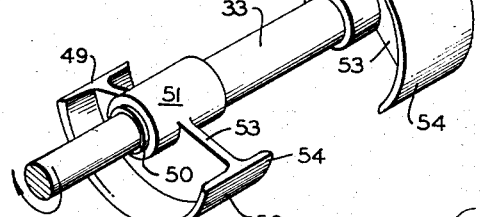
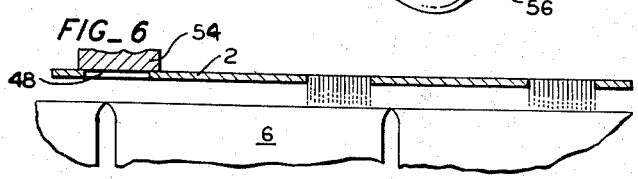
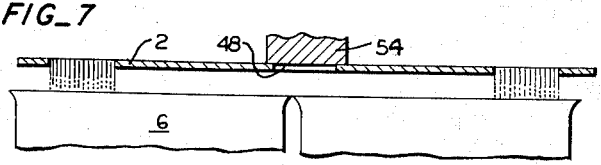
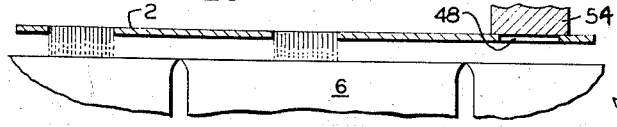
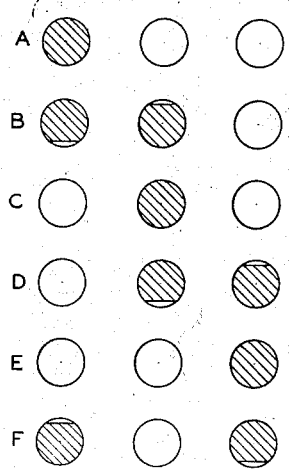

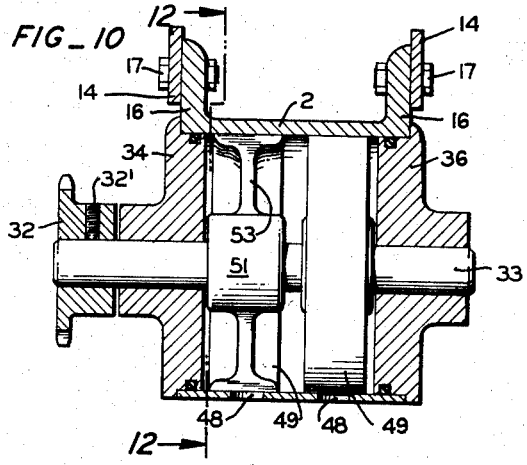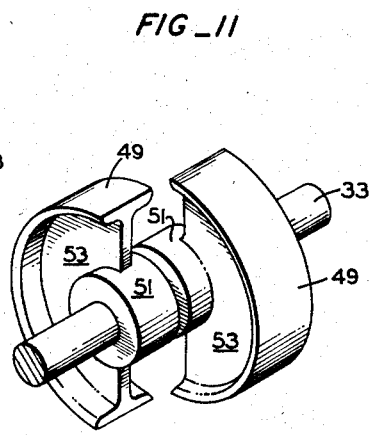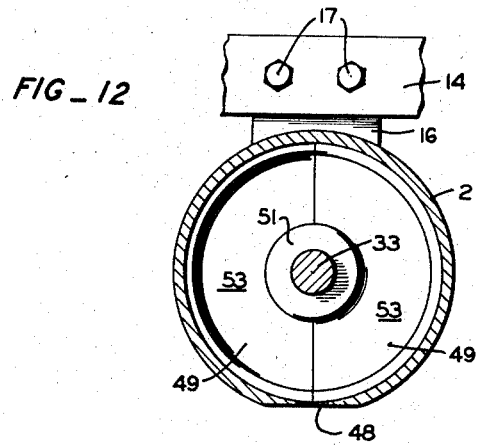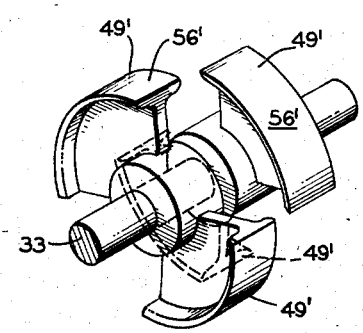

United States Patent Office 2,868,241
Patented Jan. 13, 1959

2,868,241

PRODUCT METERING AND CONTAINER FILLING APPARATUS

Gerhart A. Guckel, Los Altos, Calif., assignor to James Dole Engineering Co., San Francisco, Calif., a corporation of Nevada Application October 25, 1957, Serial No. 692,329

8 Claims. (Cl. 141—134)

This invention relates to the continuous metering of a product, such as by filling a product into containers, and more particularly relates to an improved apparatus for the continuous filling without spillage of containers which are continuously and rapidly moved relative to said apparatus.

In applicant's co-pending application Serial No. 461,457, filed October 11, 1954, now Patent No. 2,827,928, entitled "Filling Apparatus and Method," apparatus for continuously filling a series of containers also is disclosed. The present invention, while in some respects similar to the apparatus of the aforementioned co-pending application, is an improvement over such apparatus.

While the filler apparatus of applicant's co-pending application is highly effective under most operating conditions, such apparatus consists of several parts rotatably mounted relative to each other to effect periodic product flow from a filler casing. The filler of the present invention contains a minimum of moving parts mounted for rotation in a compact, comparatively short casing which imparts a rugged construction to the filler apparatus while at the same time allowing ready assembly and disassembly of the filler for cleaning and the like.

The present invention provides an apparatus which permits the continuous and uniform filling of containers by metering a product into the containers as the containers move past the filler apparatus. This apparatus is equally well suited for filling containers having their mouths spaced apart, such as glass jars or cans, as well as for filling containers positioned closely adjacent one another, such as cans having their flanges overlapped.

The present invention produces accurate metering of a filler product comprised of discrete particles as well as a liquid-form filler product comprised of a homogeneous liquid. The apparatus also provides efficient means for regulating the velocity of the filler product at various discharge points along the apparatus in accordance with the viscosity of the particular product used. The filler product may be any of the usual edible products, such as purees, baby foods, milk, soups and the like. However, this apparatus is equally well-suited for metering any non-edible filler products, such as motor oils, lotions and the like.

More particularly the present invention includes the provision of an apparatus comprising a tubular filler casing having mounted therein rotary means in the form of a valve control structure adapted to periodically open and close a series of product discharge ports arranged in a wall of the filler casing to effect periodic flow of the product through the respective discharge ports in longitudinally spaced bodily fixed streams which are immovable longitudinally of the casing. In conjunction with the filler casing is a conveyor mechanism adapted to carry a continuous supply of containers past the filler casing in an uninterrupted motion to receive product metered therethrough. Such containers are moved in timed relationship with the opening and closing of the product discharge ports by the valve control structure in the filler casing.

Various other features of the present invention will become apparent from a reading of the following disclosure.

Referring to the drawings, which disclose several desirable embodiments of the filler apparatus;

Fig. 1 shows a more or less schematic plan view of the apparatus of the invention illustrating the conveyor mechanism carrying a series of containers past the filler casing;

Fig. 2 is an end view of the filler and the conveyor mechanism looking in the direction of the arrows 2—2 of Fig. 1;

Fig. 3 is a partial longitudinal vertical section through the filler casing taken in the plane of line 3—3 of Fig. 1, illustrating one desirable embodiment of the valve control structure mounted for rotation in the casing.

Fig. 4 is a vertical section taken in the plane of line 4—4 of Fig. 3, illustrating the angularly offset arrangement of the respective valve lobes of the valve control structure;

Fig. 5 is an isometric view of the valve control structure of Fig. 3 removed from the filler casing for purposes of clarity;

Figs. 6, 7 and 8 illustrate a series of containers passing beneath the filler casing and schematically showing one desirable sequence of flow of the product from the discharge ports of the casing;

Fig. 9 is a schematic view of one desirable sequence in which the discharge ports of the filler casing may be opened and closed to allow periodic product flow therethrough;

Fig. 10 is a partial longitudinal vertical section through a modified filler casing showing a modified form of valve control structure mounted therein;

Fig. 11 is an isometric view of the valve control structure of Fig. 10 removed from the casing for clarity;

Fig. 12 is a vertical sectional view taken in the plane of line 12—12 of Fig. 10;

Fig. 13 is an isometric view of another modification of a valve control structure of a type adapted for use in the filler casing of Fig. 10.

Referring now to Figs. 1 and 2, the apparatus of this invention includes an elongated, substantially cylindrical hollow filler casing 2 which is fixedly positioned adjacent a conveyor means or mechanism 3. Any suitable conveyor means or mechanism may be utilized with the fillers disclosed herein but a desirable conveyor mechanism includes an endless conveyor belt 4 mounted directly beneath the filler casing 2 on which are carried a plurality of containers 6. The type of containers to be filled may vary and either glass jars or metal cans may be utilized. In the illustrated embodiment containers 6 are cans having the flanges thereof contacting each other or spaced apart a small distance.

The containers 6 are carried by the conveyor belt 4 directly beneath the filler casing 2. In the illustrated embodiment, the containers 6 are moved toward the right of the figure, as indicated by the arrows in Fig. 1, but such containers could equally well be moved in an opposite direction if so desired. In conjunction with the conveyor belt 4 is rotatable worm structure or mechanism 7 which positions the containers 6 in predetermined relationship on the conveyor belt 4 so that the mouths thereof are properly positioned beneath the filler casing 2 for receiving the product metered therethrough. Worm structure 7 is positioned to one side of the conveyor belt 4 and includes a shaft member 8 journalled in supporting bearings 9 at each end of the worm structure.

A helix 11 extends outwardly from the worm structure 7 and extends from one end thereof about the periphery of the worm structure to its other end. Containers 6 carried by the conveyor belt 4 engage the helix 11 on the worm structure 7 and are positioned thereby in predetermined relationship one to the other. The pitch of helix 11 determines the spacing of the containers relative to each other.

In the illustrated embodiment, the worm structure 7 does not convey the containers beneath the filler casing 2 but serves rather as a means for spacing the containers relative to each other. That is, the conveyor belt 4 desirably is moved at a speed slightly greater than the speed of rotation of the worm structure 7 and, as a result, the containers 6 are held against the helix 11 thereby maintaining the containers in proper relationship for filling. However, if desired, the containers could be supported on a stationary support beneath the filler casing 2 and the worm structure 7 could be utilized to perform the double function of moving the containers beneath the filler casing while at the same time maintaining them in proper relationship for filling.

The filler casing 2 and the conveyor mechanism 3 may be supported in any desirable manner. Preferably, as shown in Figs. 1 and 2, an open work metal frame, comprising upright frame members 12 which support longitudinally extending frame members 13, is utilized to mount the filler casing and conveyor mechanism. Extending transversely between frame members 13 are two spaced support members 14 from which is suspended the filler casing 2. The casing 2 may be connected between support members 14 in any conventional manner. In the embodiment illustrated two upright flanges 16 are connected to the casing. Flanges 16 may be an integral part of the casing 2 or may be separate members connected to the casing in any conventional manner, such as by welding. Flanges 16 have a plurality of transverse holes therein through which conventional fastening devices, such as nut and bolt means 17, pass to secure the casing to transverse members 14. Members 14 have spaced holes therethrough for reception of nut and bolt means 17.

Conveyor belt 4 is mounted for movement over a supporting frame member 18 (Fig. 2) connected to upright frame members 12 in any conventional manner, such as by bolting or welding. Worm structure 7 is supported for rotation adjacent conveyor belt 4 by laterally spaced strut members 19 securely connected to the supporting frame by bolting or welding. Strut members 19 have holes formed therein and it is in such holes that the aforementioned bearings 9 are mounted to facilitate rotation of shaft 8 of worm structure 7.

To maintain the containers 6 on the conveyor belt 4 in engagement with worm structure 7, guide means is positioned opposite the worm structure and extends substantially parallel to the axis thereof. Such guide means may take any form desired but, as illustrated in Figs. 1 and 2, a guide rod or rail 21 engages the sides of the containers opposite from worm structure 7 and precludes lateral outward movement of the containers away from such worm structure.

Worm structure 7 is rotated by any conventional drive means, such as an electric motor (not shown), connected to an extension of shaft 8 (phantom lines, Fig. 1) in any conventional manner. Such drive means produces rotation of worm structure 7 in the manner set out previously to effect proper positioning of the containers during their travel beneath the filler casing 2. Mounted on shaft 8 for rotation therewith is sprocket wheel 22. As the main drive shaft 8 of the worm structure 7 is rotated by the drive means, sprocket wheel 22 rotates therewith due to the connection of sprocket 22 with shaft 8 by any conventional means, such as set screw 22'.

Positioned above worm structure 7 is a rotatable shaft 23 journaled for rotation in a substantially U-shaped mounting bracket 24 secured to the mounting frame in any conventional manner, such as by bolt and nut means 26. Opposite ends of shaft 23 pass through aligned holes formed in the laterally extending arms 25 of the U-shaped mounting bracket 24. Shaft 23 is secured between opposite arms 25 against transverse movement in any conventional manner, such as by cotter pins (not shown), but rotation of the shaft in such bracket is not impaired thereby. Positioned adjacent one end of shaft 23 and secured thereto by any conventional means, such as set screw 27' for rotation therewith is sprocket wheel 27. Sprocket 27 is positioned directly in line with sprocket 22 mounted on shaft 8 of the worm structure 7. Connecting sprockets 22 and 27 and passing over the teeth in each of such sprockets is chain member 28. Rotation of shaft 8 of the worm structure produces rotation of shaft 23 as a result of the chain linkage between sprockets 22 and 27 positioned on the respective shafts.

At the end of shaft 23 opposite sprocket 27 is another sprocket wheel 29 also secured for rotation with shaft 23 by a set screw 29', or other conventional means. Passing over sprocket 29 is another chain 31 which is connected to a sprocket wheel 32 which forms part of the valve control structure to be described mounted in filler casing 2. Upon rotation of shaft 23, rotation of the valve control structure in the filler casing 2 is produced as a result of the chain linkage between sprocket 29 and sprocket 32. Because the worm structure 7 of the conveyor mechanism and the valve control structure are rotated by a common drive means, the valve control structure may be rotated in predetermined timed relationship with respect to the containers passing beneath the filler casing 2. Therefore, the flow of product from the filler casing may be regulated to correspond with the rate of travel of the containers passing beneath the casing.

Referring now to Figs. 3 to 5, the filler casing 2 desirably is tubular in shape, has a hollow interior which desirably is circular in internal cross-section, and has open ends. Extending longitudinally of the casing 2, desirably along the central axis thereof, is an elongated shaft 33. It is to an end of such shaft 33 that the sprocket 32, mentioned previously, is connected, such as by set screw 32'. Rotation of sprocket 32 produces corresponding rotation of shaft 33.

As can be seen in Figs. 1 and 2, opposite ends of casing 2 are externally laterally enlarged and such enlarged ends have a substantially oval cross-section. Closing off the enlarged opposite ends of the filler casing 2 are correspondingly shaped end closure plates 34 and 36. Extending through closure plates 34 and 36 centrally thereof are apertures 37 and 38, respectively, which serve as seats for shaft bearings 39 and 41, respectively. It is through such bearings 39 and 41 that the ends of shaft 33 extend and in which such shaft is journaled for rotation relative to the casing. The apertures in the end closure plates and the bearings mounted therein are formed to close tolerances to preclude leakage of the product from the casing ends as shaft 33 rotates.

To insure proper sealing of the closure plates with the opposite ends of the filler casing 2 and to prevent leakage of the product therefrom, each of the closure plates 34 and 36 is provided with a cylindrical extension 42, which corresponds in configuration to the internal shape of the casing 2. The cylindrical extensions 42 form with the remainder of the closure plates annular shoulders 43 which engage the extreme outer ends of the casing 2. In each of the cylindrical extensions 42 is formed an annular groove 44. Positioned in each of the annular grooves 44 is a sealing member 46, which desirably takes the form of a rubber or plastic O-ring.

As shown in Fig. 2, the closure plates 34 and 36 are substantially oval in external shape to conform in shape with the enlarged ends of the filler casing 2. The closure plates 34 and 36 may be secured to the casing 2 in any conventional manner but in the embodiment illustrated such closure plates are secured to the casing by bolts 47 which pass through laterally spaced holes in each of the closure plates 34 and 36 into internally threaded bores formed in the enlarged oval outer ends of the filler casing. In this manner, each of the end closure plates may be rapidly and easily removed by removing bolts 47 to allow removal of the valve control structure therefrom for rapid and easy cleaning of the control structure and the casing.

Extending through the wall of the casing 2, desirably in a row along the bottom thereof, are a plurality of product discharge ports 48. In the embodiment illustrated in Fig. 3, three such discharge ports are shown but it should be understood that any number of discharge ports could be utilized depending upon the type of product to be metered, the size of the containers to be filled, the speed of travel of such containers, and the like. While desirably such discharge ports 48 are circular, it also should be understood that any other shape could be utilized.

As mentioned previously, the valve control structure includes shaft 33 journaled for rotation within the casing 2. Secured to such shaft 33 for rotation therewith are a plurality of longitudinally spaced valve members or valve lobes 49. As will be noted in Fig. 3, three such valve members are utilized and the valve members are spaced along shaft 33 so that a valve member is cooperable with each of the product discharge ports 48. It will be noted that each valve member 49 is adapted, upon rotation of shaft 33, to move across the associated discharge port in a plane which is transverse to or extends at a right angle with respect to the longitudinal axis of casing 2.

The two valve members 49 positioned adjacent the opposite ends of the casing 2 are separated from the ends of the casing by spacer shims 50 which surround the shaft 33 and through which such shaft extends. Such shims 50 properly position the shaft and the valves mounted thereon in the casing 2 and preclude engagement of the valve members with either of the end closure plates 34, 36.

Each of the valve members 49 may be non-rotatably mounted on the rotatable shaft 33 in any conventional manner, such as by welding. Alternatively, set screws may be used; tapered pins which are adapted to pass through aligned holes formed in the hubs 51 of the respective valve members 49 and the shaft 33 also may be used.

Desirably, but not necessarily, each of the valve members 49 is identical and in the illustrated embodiment of the filler apparatus each valve member consists of a central hub 51 by means of which the valve member is secured to the shaft 33 in any of the ways mentioned previously. Radiating from central hub 51 is a connecting means, which desirably is in the form of a thin, substantially fan shaped web section or member 53. Terminating on the outer end of the web member 53 is a sealing section 54 which has as its outer surface a relatively wide discharge port sealing surface 56. Each of the valve members 49 may be considered valve lobes, the function of which will be set out hereinafter.

Desirably, and as illustrated in Figs. 4 and 5 of the drawings, the valve sealing surface 56 of each valve lobe corresponds substantially in shape to the arc of a circle, the radius of which is substantially equal to the internal radius of casing 2. In this manner upon rotation of the shaft 33 the valve lobes 49 engage the interior of the hollow filler casing 2 to periodically open and close the respective spaced discharge ports 48. As shown in Fig. 3, each sealing surface is slightly wider than the diameter of the associated discharge port. While each connecting web 53 is illustrated as being a one piece continuous fan-shaped section, the sealing section 54 of each valve lobe could be connected to the central hub 51 by a series of spaced spokes, or like structure.

As noted in the drawings, Fig. 5, a web member 53 of each valve lobe 49 is of substantially less width than the sealing section 54 having the sealing surface 56 on the outer curved face thereof. By reducing the transverse dimension of the web member relative to the sealing section, the tendency of the valve control structure upon rotation thereof to force the product in a circular path around the inside of the casing 2 is greatly diminished or completely eliminated in that the reduced size of the web member 53 more easily passes through the filler product without whipping or creating an undue amount of turbulence in the product. As a result, the product flowing through each discharge port 48 is directed in a substantially straight downward path and whipping of the product discharge stream, which would result in spillage, is precluded.

It should be understood, however, that under certain conditions the width of the connecting web portion, which connects the outer sealing section 54 to the central hub 51, may be substantially equal in width to such sealing section 54. Also, although desirably the respective valve lobes are of one piece construction, if desired, the lobes may be formed from separate sections which are joined together as a unit.

Because the containers are carried by the conveyor mechanism 3 under the filler casing 2 in a continuous uninterrupted motion, it is necessary that the product discharge ports in the casing be periodically closed to prevent spillage at the time when two adjacent container flanges pass beneath each of the discharge ports.

As is shown in Fig. 5, each of the valve lobes 49 is positioned on the shaft 33 in an angularly offset relationship relative to the other valve lobes. In this manner upon rotation of shaft 33 the discharge ports 48 are opened and closed in periodic or sequential fashion thereby allowing periodic flow of the product from the casing 2 in separate spaced bodily fixed streams which are immovable longitudinally of the casing. In the embodiment illustrated, each of the valve lobes 49 extends around the shaft 33 desirably to the extent of 150°. It should be understood, however, that the peripheral arcuate extent of the sealing section 54 of each valve lobe may be modified as desired to effect a predetermined quantity of product flow through an individual discharge port per unit of time.

Figs. 6 through 8 schematically illustrate one desirable sequence of product flow through the series of discharge ports 48 formed in the bottom of the filler casing 2 of Fig. 3 when the valve control structure is rotated in the direction of the arrow of Fig. 5. In Fig. 6, the left discharge port is fully closed to prevent spillage of the product as the edges of two adjacent containers pass therebeneath. At such time the open mouths of adjacent containers are directly beneath the middle and right discharge ports and such ports are fully open to allow product flow therethrough. In Figs. 7 and 8, the middle and right discharge ports respectively, are closed as the edges of adjacent containers pass therebeneath.

As mentioned previously, the sequence in which the respective discharge ports are opened and closed by the valve lobes 49 may be modified in any manner desired depending upon the offset positioning of the valve lobes on the rotating shaft 33 of the valve control structure, as well as by the peripheral extent of the sealing surface 56 on each of the valve lobes.

Fig. 9 is a schematic view illustrating, in another manner, a desirable sequence in which the valve lobes open and close the respective product discharge ports of the filler apparatus of Fig. 3. The lined areas in Fig. 9 illustrate those portions of the discharge ports which are closed while the clear areas illustrate product flow through such ports. Rows A, C and E of Fig. 9 correspond to the port and valve lobe arrangement shown in Figs. 6, 7 and 8, respectively, in which the left port, middle port and right port are periodically closed in that sequence.

Rows B, D and F of Fig. 9 schematically illustrate the transitional stages of the product flow through the respective discharge ports. Because, as described previously, each of the valve lobes 49 desirably extends approximately 150° around shaft 33, there is approximately a 30° overlap (see Fig. 4) between the leading edge of one valve lobe and the trailing edge of the valve lobe adjacent thereto. Desirably, however, each of the product discharge ports 48 extends slightly more than 30° across the bottom of the cylindrical casing 2 thereby insuring that at least a portion of two of the three discharge ports will be open at the same time.

The transitional stage in which one port is just beginning to open as another port is substantially fully closed is shown in rows B, D and F of Fig. 9. For example, as shown in row B, as the left port begins to open, the middle port is substantially fully closed. It should be understood, however, that the sequence in which the ports open and close, as well as the length of time which such ports remain open, may be varied as desired to produce a particular result. Although in the illustrated embodiment two ports are at least partially open at the same time such arrangement also could be modified as desired.

By varying the arrangement of the valve lobes 49, discharge ports 48, speed of the conveyor and the quantity of product fed per unit of time, each with respect to the other, an unlimited number of different filling sequences can be produced without spillage of the product even though the mouths of the containers are spaced apart. Furthermore, by varying the cross-sectional area of the discharge ports it is possible to control the velocity of product flow in accordance with the viscosity of the product used. This in turn permits the minimizing of splashing of the product in the container and produces a means of control over the manner in which the product builds up in each container as it is conveyed beneath the filler. It is also to be understood in this regard that in any arrangement used, the quantity of product discharged from the filler may be determined by the quantity fed thereinto. Because the containers are moved might be caused by splashing over the sides of the container as the conveyor mechanism is started and stopped repeatedly, is precluded.

In the embodiments of the filler illustrated, desirably the product is fed into the filler casing 2 from the side and centrally thereof through an entry port 61 which consists of an externally threaded extension 62 connectable by means of a conventional threaded pipe connection, including nut 63, to a supply conduit 64. As is schematically shown in Fig. 1 conduit 64 is connected by means of a so-called constant volumetric discharge pump 66 to a product supply 67. Pump 66 provides means for supplying a fixed predetermined quantity or volume of the product per unit of time to the filler casing 2. Such quantity of product is regulatable at will by means of a variable speed motor 68 connected to drive the pump.

While the product entry port 61 is shown extending from the filler casing from the side centrally thereof, it should be understood that the position of the entry port relative to the casing may be varied to meet a particular need. Similarly, under certain conditions, it may be desirable to utilize a gravity feed by positioning the product supply above the filler casing 2 thereby precluding the need for the motor 68 and pump 66. Generally, however, when a high viscosity product is to be metered, a motor driven pump is desirable.

The present filler apparatus, while usable with pumpable products of various types and viscosities, is particularly well adapted for metering heavy viscous products, such as tomato paste and the like. The simple construction of the filler apparatus, including the valve control structure described previously, results in a rugged filler which can withstand the stresses introduced as a result of the heavy product being acted upon. As pointed out previously, by reducing the width of the connecting web portion 53 of each of the valve lobes 49, the lobes are able to pass through a viscous product easily while creating a negligible amount of turbulence within the casing thereby maintaining the amount of whipping of the product streams passing through the discharge ports to a very low degree.

As previously mentioned, the various features of the filler, such as the shape and number of discharge ports, the size and spacing of such ports, the number of valve rotor lobes, the size and spacing of such lobes and the peripheral extent thereof, as well as the length and diameter of the filler casing, may be widely varied in accordance with the size of the containers which are to be filled, the container speed of movement relative to the filler casing, the type of product to be metered and the amount of such product pumped into the filler per unit of time.

As an illustrative example of typical operating conditions for one filler of the type illustrated in Figs. 3 to 5 of the drawings, such filler may be used for filling can-type containers of substantially large capacity, such as cans having a three-quart capacity. Such cans generally are designated No. 10 tin in the trade and carry the description 603 x 700. Such cans are 6$\frac{3}{16}$ inches in diameter by 7 inches high and, as mentioned previously, are of the type which are used to pack tomato pastes, soups and the like for use in industrial and institutional kitchens.

When a relatively viscous product, such as tomato paste, is to be filled in containers of the size described, an exemplary filler casing and valve control structure having the following dimensions has been found to be desirable: the overall casing length, exclusive of the end closure plates 34 and 36 connected to the casing to close off the opposite ends thereof, is 11 inches; three product discharge ports are equally spaced along the bottom of the casing; desirably such ports are circular in cross-section with adjacent ports being spaced 4$\frac{1}{8}$ inches between centers with the centers of the two end ports being spaced 1$\frac{3}{8}$ inches from the respective ends of the casing; the center port is centrally located relative to the casing.

Each port 48 is circular in cross-section and is 1$\frac{1}{8}$ inches in diameter. The inside diameter of such casing is 4 inches while the diameter of the shaft 33 upon which the valve lobes are mounted is 1 inch. Because the valve lobes are adapted to embrace the inner wall of the casing during rotation thereof transverse to the casing axis, the radius of each lobe, from the longitudinal axis of the transverse hole passing through the aperture in the hub 51 to the arcuate sealing surface 56, is 2 inches. The width of the sealing surface 56 of each lobe is 1½ inches and each sealing surface has a circumferential extent of 150°. Web section 53 of each valve lobe is ¼ inch wide.

Because of the comparatively high viscosity of the tomato paste to be metered, the valve control structure is rotated at a comparatively slow speed. Such speed of rotation conforms to the speed of travel of the cans to be filled. In a filling operation using 603 x 700 cans, the conveyor is run at the rate of 32 cans per minute, which is equivalent to a product flow of 24 gallons per minute from the casing. At such can speed, the valve control structure is rotated at 32 revolutions per minute, which results in one can filling per revolution of the valve control structure. Because of the large size of the 603 x 700 cans, a quantity of product is discharged into each can from each discharge port as the cans pass beneath the filler.

As a result of the relatively high viscosity of the filler products of the type described, the valve control structure is rotated at the comparatively slow speed mentioned above. It should be understood, however, that the apparatus is capable of use at speeds of much lower, as well as much higher, degree. When used with smaller cans or containers than the size described above, the speed of rotation of the shaft generally will be increased while such speed would be decreased when used with containers larger than the size above described. Furthermore, the speed of rotation of the shaft 33 of the valve control structure may be varied relative to the speed of the containers passing underneath the filler casing by modifying the size of the sprockets mounted on the respective parts of the filler apparatus. Generally, however, shaft 33 rotates at a speed corresponding to the rate of container travel on conveyor mechanism 3.

Although the particular filler described above has at least a portion of two discharge ports simultaneously open, the size of the valve lobes may be varied so that only one port is open at a time thereby adapting the filler apparatus for use with smaller containers, such as baby food cans and the like.

Referring now to Figs. 10 to 12 of the drawings, a modification of the valve control structure is illustrated. However, similar reference numerals are used to designate similar parts. As shown in the drawings, only two valve lobes 49 are utilized in the filler modification illustrated in conjunction with two product discharge ports 48. The valve lobes 49 are structurally similar to the lobes described previously herein but desirably each of the valve lobes extends for 180° about the mounting shaft 33 extending through the valve filler casing. As a result, during 180° of rotation of shaft 33 one discharge port is fully open while the other discharge port is fully closed. Similarly, because there is no overlap of one valve lobe with respect to the other (see Fig. 12), as one discharge port is just closing the other discharge port is just opening. As a result, when the lobes are in the position shown in Fig. 12, there is partial product flow from each of the discharge ports.

This partial flow is desirable in that the product, as described previously, desirably is pumped into the filler casing in predetermined volumetric quantities under substantial pressure. If both discharge ports were simultaneously completely closed, the casing would be ruptured by the pressure of the product pumped into the casing. However, if a gravity product feed is used, both ports may be closed at the same time without resultant filler damage.

While the filler structure of Figs. 10 through 12 is basically the same as the filler structure described previously, this modification has the added advantages of greater simplicity and more compact construction. The filler modification of Fig. 10 also is particularly advantageous in that it may be utilized to fill containers of various sizes, running from small baby food cans to the large No. 10 tins described previously. To modify the structure for such varied filling operations, it is unnecessary to change or modify any parts of the apparatus. This filler modification is adapted to fill various size containers merely by varying the speed of travel of the container line passing beneath the filler casing.

A further modification of the valve control structure of this invention is illustrated in Fig. 13. Such modification is similar to the valve control structure shown in Figs. 10 to 12 in that only two valve members are utilized in each casing. The valve control structure of Fig. 13 is intended for use in a casing of the type shown in Fig. 10. However, as illustrated in Fig. 13, each of the valve members comprises two offset lobe sections 49' which are positioned diametrically opposite each other on the rotatable shaft 33 within the casing. Desirably the port sealing surface 56' of each of such lobe sections 49' extends 90° in an arcuate direction.

By dividing each of the valves into two sections as illustrated, the speed of rotation of the valve control structure may be decreased to one-half the speed of travel of the containers carried by the conveyor mechanism beneath the filler casing. Such structure is particularly advantageous in that it allows the speed of rotation of the valve lobes to be materially decreased without decreasing the quantity of product flow from the filler or the filling rate of the containers passing thereby. By decreasing the speed of rotation of the valve control structure the tendency of a fluid product, such as milk, to whip as it passes in separate bodily fixed streams through the spaced discharge ports is materially reduced thereby precluding the possibility of spillage as the containers are filled.

The fillers described herein are adapted for the continuous filling of any pumpable product and may be readily employed with aseptic sealing apparatus like that disclosed in Patent No. 2,549,266, dated April 17, 1951.

It should be understood that numerous modifications of the filler apparatus of this invention may be produced by varying the respective features of the filler, as set out herein previously. The filler modifications described herein are intended to be illustrative of several desirable types of fillers, but other modifications may become evident to one skilled in the art upon reading the foregoing description. The present invention should not be limited, however, by the foregoing description but should be interpreted in light of the following claims.

I claim:

1. Apparatus for filling containers with a product comprising a hollow tubular filler casing having at least two discrete longitudinally spaced product discharge ports in a wall thereof; means for introducing into said casing product to be filled into said containers; a valve control structure movably mounted in said casing whereby said product to be metered may flow thereabout comprising at least two longitudinally spaced, discrete, angularly offset valve lobes cooperating with the respective ports, each lobe being movable substantially in a plane at a right angle with respect to the axis of the casing, and means for moving said lobes relative to the discharge ports for opening and closing the same in sequential order to effect periodic flow of said product therethrough in separate longitudinally spaced bodily fixed streams immovable longitudinally with respect to said casing; and conveyor means for continuously moving said containers past said discharge ports in timed relationship with the movement of said valve control structure to effect uniform filling of said containers by said bodily fixed streams without spillage.

2. Apparatus for filling containers with a product comprising a hollow cylindrical filler casing having a plurality of longitudinally spaced product discharge ports in a wall thereof; means for introducing into said casing product to be filled into said containers; a valve control structure in said casing and extending longitudinally thereof, said valve control structure comprising a shaft mounted for rotation in said casing in spaced relationship relative to said wall whereby said product introduced into said casing may flow about said shaft, a plurality of angularly offset valve lobes spacedly mounted on said shaft and extending substantially radially therefrom for rotation therewith to open and close the respective discharge ports for effecting periodic product flow therethrough in separate bodily fixed streams; means for rotating said shaft; and conveyor means for moving said containers past said discharge ports in timed relationship with the rotation of said valve control structure to effect uniform filling of said containers in their travel past said casing.

3. Apparatus for filling containers with a product comprising a hollow cylindrical filler casing having a plurality of product discharge ports in a wall thereof and longitudinally spaced therealong in a row; means for introducing a product into said casing; an elongated shaft extending longitudinally of said casing and rotatable therein, valve lobes corresponding in number to said discharge ports fixedly mounted in angularly offset longitudinally spaced relationship on said shaft, each of said lobes including a relatively wide discharge port sealing surface in the shape of an arc which is connected to said shaft by relatively narrow connecting means whereby such lobe is rotatable with said shaft to open and close an associated discharge port and whipping of said product as such lobe rotates is minimized; means for rotating said shaft to open and close said discharge ports periodically by said lobes to effect product flow through said ports in separate bodily fixed streams; and conveyor means for moving said containers past said discharge ports in timed relationship with the rotation of said shaft to effect uniform filling of said containers in their travel past said casing.

4. A filler comprising a hollow casing having at least two product discharge ports in a wall thereof, a valve control structure in said casing comprising a shaft extending longitudinally of and mounted in spaced relationship relative to said wall whereby product introduced into said casing may flow about said shaft and substantially fill said casing, said shaft being journalled for rotation relative to said discharge ports, at least two angularly offset valve lobes spacedly secured to said shaft and extending substantially radially therefrom for rotation therewith for periodically sealing the respective discharge ports upon rotation of said shaft, said valve lobes being movable substantially in planes at right angles with respect to the axis of said casing whereby said lobes pass through such product in said casing during movement thereof to open and close said discharge ports in predetermined timed relationship to allow periodic flow of such product from said casing.

5. A product metering device comprising a hollow tubular casing having a substantially cylindrical inner surface and a plurality of longitudinally spaced product discharge ports in a wall thereof, a shaft extending longitudinally through said casing and mounted in spaced relationship relative to said wall whereby product introduced into said casing may flow about said shaft and substantially fill said casing, said shaft being journalled for rotation in said casing, and a plurality of discrete, substantially radially extending angularly offset valve lobes secured to said shaft for rotation therewith and longitudinally spaced therealong, each of said valve lobes having a discharge port sealing surface in the shape of an arc spaced from said shaft, said valve lobes passing through such product in said casing as said shaft rotates to open and close periodically the associated discharge ports to allow periodic flow of such product from said discharge ports in bodily fixed streams, immovable longitudinally with respect to said casing.

6. A filler for metering a product comprising a hollow tubular casing having a plurality of longitudinally arranged spaced apart product discharge ports in a wall thereof, and a valve control structure mounted in said casing comprising a longitudinally extending shaft journalled for rotation, a plurality of angularly offset valve lobes longitudinally spaced along said shaft and secured thereto for rotation therewith, the number of said valve lobes being equal to the number of said plurality of discharge ports, each valve lobe including a relatively wide discharge port sealing surface in the shape of an arc which is connected to said shaft by relatively narrow connecting means for minimizing whipping of the product as such valve lobe rotates, each said sealing surface being arranged to periodically open and close an associated discharge port upon rotation of said shaft whereby a periodic flow of product from said discharge port in a bodily fixed stream immovable longitudinally with respect to said casing may be effected.

7. A filler for metering a flowable product into a series of containers conveyed therepast comprising a hollow casing having a plurality of discrete product discharge ports in a wall thereof longitudinally spaced therealong, and valve control structure movably mounted in said casing comprising a rotatable shaft extending longitudinally through said casing in spaced relationship relative to said wall whereby product introduced into said casing to be metered therefrom may flow about said shaft, a plurality of substantially arcuate, angularly offset discharge port sealing valve lobes mounted in spaced relationship on said shaft and extending radially therefrom and rotatable therewith, said valve lobes passing through such product introduced into said casing whereby disturbance of such product and turbulence in said casing is minimized as said shaft rotates, each of said valve lobes including a discharge port sealing surface spaced from said shaft and operable to periodically open and close an associated discharge port as said shaft rotates whereby a periodic flow of product from such discharge port in a bodily fixed stream immovable longitudinally relative to said casing may be effected.

8. Apparatus for metering a flowable product and filling a series of containers comprising a hollow filler casing having a plurality of discrete product discharge ports in a wall thereof longitudinally spaced therealong; means for introducing product to be metered into said casing; valve control structure movably mounted in said casing comprising a rotatable shaft extending longitudinally through said casing in spaced relationship relative to said wall whereby said product introduced into said casing may flow about said shaft, a plurality of substantially arcuate, angularly offset discharge port sealing valve lobes mounted in spaced relationship on said shaft and extending radially therefrom and rotatable therewith, said valve lobes passing through said product in said casing as said shaft rotates whereby disturbance of said product and turbulence in said casing is minimized; means for rotating said shaft to open and close said discharge ports periodically with said valve lobes to effect periodic product flow through said ports in separate bodily fixed streams immovable longitudinally relative to said casing; and conveyor means for moving said containers past said discharge ports in timed relationship relative to rotation of said shaft whereby uniform filling of said containers with said product may be effected.

References Cited in the file of this patent

UNITED STATES PATENTS

| | | |
|---|---|---|
| 1,571,744 | Vorel | Feb. 2, 1926 |
| 2,095,064 | Harper | Oct. 5, 1937 |
| 2,631,768 | Martin et al. | Mar. 17, 1953 |
| 2,666,565 | Barnes et al. | Jan. 19, 1954 |
| 2,752,083 | Ullman et al. | June 26, 1956 |
| 2,785,707 | Ryan et al. | Mar. 19, 1957 |

UNITED STATES PATENT OFFICE

CERTIFICATE OF CORRECTION

Patent No. 2,868,241                                              January 13, 1959

Gerhart A. Guckel

It is hereby certified that error appears in the printed specification of the above numbered patent requiring correction and that the said Letters Patent should read as corrected below.

Column 6, line 10, after "amount" insert -- of --; column 7, line 43, after "moved" insert -- in an uninterrupted motion, spillage of the product, which --.

Signed and sealed this 21st day of April 1959.

(SEAL)
Attest:

KARL H. AXLINE                                                      ROBERT C. WATSON
Attesting Officer                                                Commissioner of Patents